United States Patent [19]

Perry

[11] Patent Number: 4,945,347

[45] Date of Patent: Jul. 31, 1990

[54] MOTION AND ORIENTATION RESPONSIVE DEVICE FOR SEISMIC, INTRUSION, AND TILT ALARMS AND THE LIKE

[76] Inventor: John C. Perry, 3170 Falcon Dr., Carlsbad, Calif. 92008

[21] Appl. No.: 169,318

[22] Filed: Mar. 17, 1988

[51] Int. Cl.⁵ .................. G08B 21/00; H01H 35/02
[52] U.S. Cl. .......................... 340/689; 200/61.45 R; 340/690
[58] Field of Search .............. 340/689, 690, 566, 669; 200/61.45 R, 61.52, 61.48, 61.51; 73/652, 654, 505, 514, 516 LM, 517 AV; 33/366, 391

[56] References Cited

U.S. PATENT DOCUMENTS

| | | | |
|---|---|---|---|
| 1,870,347 | 8/1932 | Roberts . | |
| 2,448,181 | 8/1948 | Holm | 200/138 |
| 3,798,594 | 3/1974 | Funk | 200/61.45 R |
| 3,991,178 | 12/1976 | Hamilton | 340/282 |
| 4,214,238 | 7/1980 | Adams et al. | 340/690 |
| 4,262,289 | 4/1981 | Rivera | 340/690 |
| 4,297,690 | 10/1981 | Baker | 340/690 |
| 4,364,033 | 12/1982 | Tsay | 340/690 |
| 4,381,504 | 4/1983 | Bitko | 340/689 |
| 4,484,186 | 11/1984 | Wood | 340/689 |
| 4,575,713 | 3/1986 | Piper | 340/546 |
| 4,679,033 | 7/1987 | Hwang | 340/566 |

Primary Examiner—Joseph A. Orsino
Assistant Examiner—Thomas J. Mullen, Jr.
Attorney, Agent, or Firm—Donald R. Nyhagen

[57] ABSTRACT

A motion and orientation responsive device having a pendulum pivotally mounted between its ends, and means for detecting relative displacement of the upper pendulum end and a zero position reference on the pendulum support from certain normal relative positions thereof in response to either or both translational and rotational displacements of the device. Presently preferred embodiments of the invention are a seismic or earthquake alarm, an intrusion alarm, and a tilt alarm. In these preferred embodiments, the pendulum shaft is a slender resilient wire, and its pivot is situated close to its lower center of mass in order to amplify the lateral motion of the upper pendulum end for a given angle of pendulum rotation and thereby enhance the sensitivity of the device to low magnitude displacements. The pendulum and zero position reference in one preferred embodiment are uniquely constructed and arranged to automatically align themselves in a zero position when the device is stationary in its normal orientation without the necessity of precisely positioning or adjusting the alarm device to compensate for manufacturing tolerances or improper orientation of the object which supports the device. A vibratory or acoustically actuated electrical control circuit for the device and other uses.

39 Claims, 4 Drawing Sheets

MOTION AND ORIENTATION RESPONSIVE DEVICE FOR SEISMIC, INTRUSION, AND TILT ALARMS AND THE LIKE

BACKGROUND OF THE INVENTION

1. Field of the invention:

This invention relates generally to devices of the class which are responsive to motion and/or orientation change relative to the gravitational field. The invention relates more particularly to a novel pendulum-type motion and orientation responsive device useful as a seismic, intrusion, or tilt alarm or the like and to a novel automatic normalizing circuit for the device and other purposes.

2. Prior Art:

Simply sated, motion and/or orientation responsive devices of the class to which this invention pertains comprise a pendulum pivotally mounted on a support to be disposed in motion and/or orientation responsive relation to an object or other means to be monitored in such a way that a disturbance in the form of motion, or more accurately a change in motion state, i.e. acceleration, and/or a change in the orientation of the object relative to the gravitational field cause(s) relative angular movement of the pendulum and support with respect to one another, and means for detecting such relative angular movement. This relative angular movement of the pendulum and its support may occur in any one of the following modes: (a) rotation of the pendulum on its pivot axis relative to both the pendulum support and the gravitational field while the support remains in a fixed orientation about the pendulum pivot axis relative to the gravitational field; (b) a change in the orientation of the pendulum support about the pendulum pivot axis relative to the gravitational field while the pendulum remains in its normal vertical orientation relative to the gravitational field; (c) simultaneous rotation of the pendulum on its pivot axis relative to the gravitational field and a change in the orientation of the pendulum support about the pendulum pivot axis relative to the gravitational field.

It is important to note at the outset that, as indicated above, the expression "orientation relative to the gravitational field" and other similar expressions used herein refer to orientation relative to the gravitational field about the pendulum pivot axis.

Devices of this kind are responsive to both motions, or more accurately accelerations (i.e. changes in motion state) of the pendulum support laterally of the pendulum and a change in the orientation of the pendulum support relative to the gravitational field. These motion and orientation changes produce one of the above modes (a), (b), (c) of relative angular movement of the pendulum and its support. Such relative angular movement is detected by the detection means of the device and may activate an alarm or trigger some other action.

The prior art is replete with an assortment of pendulum-type motion and/or orientation responsive devices of the class described. Following is a list of prior patents disclosing such devices:

U.S. Pat. No. 1,870,347 (Roberts): Discloses a mass movement detector having a pendulum supported at its upper end and actuated by mass movement of earth to engage the lower end of the pendulum with a surrounding electrical contact for energizing an electrical alarm circuit.

U.S. Pat. No. 2,448,181 (Holm): Discloses an intrusion/fire alarm having a pendulum supported at its upper end for generating an alarm in response to a fire or intrusion.

U.S. Pat. No. 3,991,178 (Hamilton): Discloses a boat intrusion alarm having a pendulum supported at its upper end and actuated by tilting of the boat in response to an intrusion thereon to actuate an alarm.

U.S. Pat. No. 4,214,238 (Adams et al): Discloses a seismic trigger having an inverted compound pendulum pivoted at its center with its mass distributed rather than concentrated and the greater extension of its mass above its pivot and whose rotation in response to a seismic disturbance actuates a photoelectric sensor.

U.S. Pat. No. 4,262,289 (Rivera): Discloses a seismic alarm having hanging metal straps mounting confronting electrical contacts and a weight attached to one strap to form a pendulum which swings in response to a seismic disturbance to close the contacts.

U.S. Pat. No. 4,297,690 (Baker): Discloses earthquake alarms with both top and bottom supported pendulums whose weighted ends are engagable with surrounding electrical contacts to energize electrical alarms in response to seismic disturbances.

U.S. Pat. No. 4,679,033 (Hwang): Discloses a vibration sensor having a flexible, bottom supported pendulum with an upper conical weight engagable with a central electrical contact to energize an electrical alarm in response to vibrations.

U.S. Pat. No. 4,381,504 (Bitko): Discloses a vibration and tilt alarm with a hanging pendulum whose lower weight is engagable with a surrounding electrical contact to energize an electrical alarm circuit.

U.S. Pat. No. 4,484,186 (Wood): Discloses an earthquake alarm having a top supported pendulum engagable with a surrounding ring electrical contact to energize an alarm circuit in response to a seismic disturbance.

U.S. Pat. No. 4,575,713 (Piper): Discloses an intrusion alarm to be hung on a door knob and having a bottom supported flexible pendulum engagable with a surrounding electrical contact to energize an alarm in response to opening of the door.

U.S. Pat. No. 4,364,033 (Tsay): Discloses a seismometer responsive to both horizontal and vertical seismic motions.

From the above discussion of the listed patents, it will be understood that their devices are essentially pendulum-type motion and/or orientation responsive devices. These and other similar devices have certain deficiencies which the present invention overcomes. Among the foremost of these are relatively low sensitivity, complexity, large size and/or weight, necessity of being supported in a precise orientation relative to the gravitational field, necessity of being initially "zeroed" by manual adjustment, and unpleasing appearance.

SUMMARY OF THE INVENTION

According to one of its aspects, the present invention provides an improved pendulum-type motion and orientation responsive device having a pendulum with a normally upper end and a normally lower center of mass, and pivot means pivotally mounting the pendulum between its ends on a support, whereby the pendulum has an upper end portion of substantial length extending above the pendulum pivot. Associated with the upper pendulum end is a zero position reference This zero position reference and the upper pendulum end undergo relative movement generally laterally of the pendulum during relative angular movement or rotation of the pendulum and support about the pendulum pivot.

The improved device of the invention is arranged to be supported in a certain normal position relative to the gravitational field, wherein the pendulum support has a certain normal orientation relative to the gravitational field, and the pendulum assumes a normal position, referred to herein as a vertical position, wherein an axis passing thru the pivot and the lower center of mass of the pendulum is substantially vertical. In these normal positions, the upper pendulum end and the zero position reference occupy certain relative positions, referred to as normal relative positions, with respect to one another. A disturbance of the device resulting in either or both translational motion or displacement (acceleration) of the device laterally of the pendulum and rotational motion or displacement of the device about the pendulum pivot relative to the gravitational field will cause rotation of either or both the pendulum and the pendulum support about the pendulum pivot from their normal relative positions and thereby relative movement or displacement of the upper pendulum end and the zero position reference from their normal relative positions. The upper pendulum end and the zero position reference thus provide coacting means for indicating or determining the relative angular positions of the pendulum and its support.

According to one feature of the invention, the improved motion and orientation responsive device includes means for sensing or detecting relative movement or displacement of the upper pendulum end and the zero position reference from their normal relative positions in response to such a disturbance. In the preferred embodiments of the invention, this sensing or detecting function is performed by the upper pendulum end and the zero position reference which are electrically conductive and movable into and from electrical contact with one another to close and open an electrical circuit path between the pendulum and reference.

According to another feature of the invention, the improved motion and orientation device includes an electrical alarm circuit for generating an alarm signal in response to relative movement of the upper pendulum end and zero position reference from their normal relative positions to certain other relative positions as a result of translational or rotational displacement of the device from a stationary or quiescent state and normal orientation relative to the gravitational field. In its preferred form, this alarm circuit comprises an electric alarm and means for energizing the alarm thru the electrically conductive upper pendulum end and zero position reference which contact one another to close a current path therebetween in such certain other relative positions thereof.

The invention has three additional highly unique and particularly beneficial preferred features which concern the sensitivity, operability, and ease of set up of the improved motion and orientation responsive device. One of these features resides in the location of the pendulum pivot which is situated between the longitudinal center and center of mass of the pendulum and preferably close to the mass center in order to amplify the relative displacement of the upper pendulum end and the zero position reference in response to relative rotation of the pendulum and its support. This amplification substantially enhances the sensitivity of the device to slight motion and orientation changes.

The second of the additional preferred features of the invention resides in the construction of the pendulum itself. The preferred pendulum comprises an arm in the form of a slender, resiliently flexible wire-like shaft fixed at its normally lower end to a weight. This pendulum arm is believed to have a whip-like action during pendulum oscillation which further enhances the sensitivity of the device to translational and rotational displacements.

The third of the three additional preferred features of the invention resides in an automatic normalizing action which occurs in the motion and orientation responsive device and operates to realign the upper pendulum end and the zero position reference in their normal relative positions when the device becomes stationary in its normal orientation relative to the gravitational field following disturbance or displacement of the device. This automatic normalizing action automatically "zeros" or normalizes the device, that is automatically restores the upper pendulum end and the zero position reference to their normal relative positions and thereby shuts off the alarm, without the necessity of either precisely positioning or adjusting the device in order to compensate or correct for manufacturing tolerances or improper orientation of the support for the device when it is initially set up for operation.

Several presently preferred embodiments of the invention are disclosed. One of these disclosed embodiments is an automatic zeroing or normalizing device which need be neither precisely oriented relative to the gravitational field nor manually adjusted when initially set up for operation. A second embodiment is an alarm device whose upper pendulum end and zero position reference are aligned in their normal relative positions by manual adjustment at the time the device is set up for operation and return to this initial alignment following a disturbance to zero or normalize the device. A third disclosed embodiment is an alarm device whose upper pendulum end and zero position reference are aligned in their normal relative positions by proper positioning of the device at the time it is set up for operation and return to these positions following a disturbance. These disclosed embodiments are useful as seismic or earthquake alarms, intrusion alarms, tilt alarms and for many other purposes.

DESCRIPTION OF PREFERRED EMBODIMENTS

Figure 1:
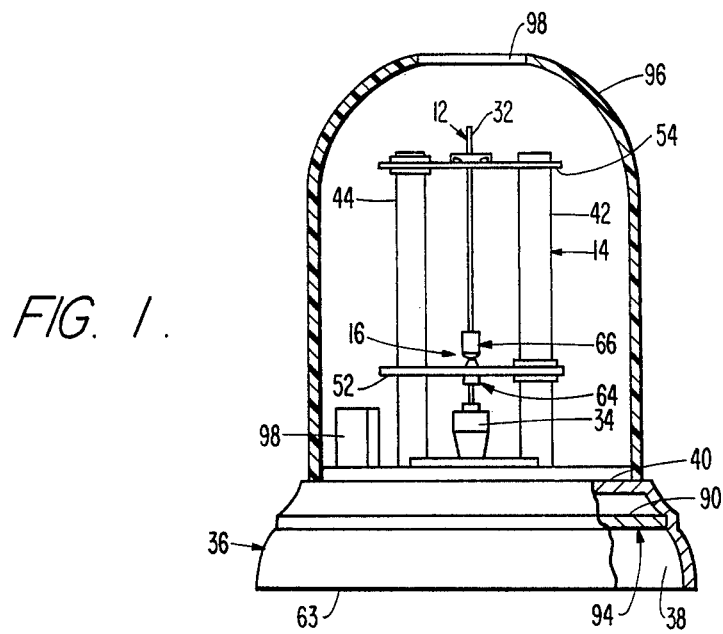
FIG. 1 is a side elevation of a motion and orientation responsive device according to the invention which is intended primarily for use as a seismic alarm with an outer cover and base of the device shown in section to expose the interior of the device.
Figure 2:
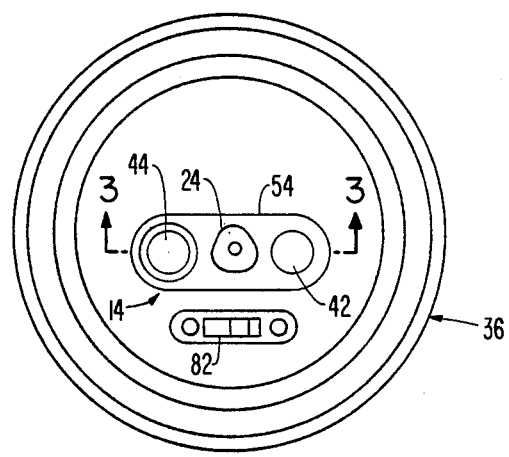
FIG. 2 is a top plan view of the device in FIG. 1 with the cover removed.

Referring now to these drawings and first to FIGS. 1-6, there is illustrated an improved motion and orientation responsive device 10 according to the invention. The device includes a pendulum 12, a pendulum support 14, and pivot means 16 pivotally or swingably mounting the pendulum between its ends on the support. The pendulum has a normally upper end 18 and a normally lower center of mass 20. The pivot means 16 pivotally mounts the pendulum 12 on the support 14 for swinging of the pendulum on a pivot point or axis 22 situated between its upper end 18 and lower center of mass 20. For the reasons mentioned earlier and explained later, the pivot point or axis 22 is preferably located between the longitudinal center and the lower center of mass of the pendulum and ideally close to the mass center.

Associated with the upper end 18 of the pendulum 12 is a zero position reference 24 on the pendulum support 14. During relative angular movement of the pendulum and support about the pendulum pivot point or axis 22, the upper pendulum end 18 and the zero position reference 24 undergo relative movement generally laterally of the pendulum. As mentioned earlier, such relative angular movement of the pendulum 12 and support 14 may occur in any one of three different modes, as follows: (a) rotation of the pendulum on its pivot axis 22 relative to both the support and the gravitational field while the support remains in a fixed orientation about the pivot axis relative to the gravitational field, or (b) rotation of the pendulum support about the pendulum pivot axis relative to the gravitational field while the pendulum remains in its normal vertical orientation relative to the gravitational field, or (c) simultaneous rotation of the pendulum and the pendulum support about the pendulum pivot axis relative to the gravitational field. Relative movement of the upper pendulum end 18 and the zero position reference 24 generally laterally of the pendulum occurs, therefor, during relative angular movement of the pendulum 12 and its support 14 in any one of the above modes (a), (b), (c).

The device 10 is so constructed and arranged that when the device is stationary with the support 14 disposed in a certain normal orientation, to be explained later, relative to the gravitational field, the pendulum 12 assumes its normal vertical position, wherein an axis passing thru the pivot point 22 and lower center 20 of mass of the pendulum is substantially vertical. In these normal positions, the upper pendulum end 18 and the zero position reference 24 occupy certain relative positions with respect to one another which are referred to herein as their normal relative positions. Relative angular movement of the pendulum 12 and support 14 in any one of the above modes (a), (b), (c), causes the upper pendulum end 18 and the zero position reference 24 to undergo relative movement generally laterally of the pendulum from and to these normal relative positions.

Included in the device 10 are means 26 for sensing or detecting relative angular movement of the upper pendulum end 18 and the zero position reference 24 from and to their normal relative positions. In the preferred embodiment illustrated, this detecting means comprises the upper pendulum end 18 and zero position reference 24 which function as electrical contacts that may be utilized to control some means, such as an alarm. To this end, the upper pendulum end 18 and the zero position reference 24 are electrically conductive, are spaced from one another when the pendulum end and zero reference occupy their normal relative positions, and enter into electrical contact with one another, to complete an electrical path therebetween, upon their relative movement from their normal relative positions to certain other relative positions. Thus, the upper pendulum end 18 and the zero position reference 24 form, in effect, electrical contacts (26) which open and close in response to relative movement of the upper pendulum end and the zero position reference between their normal relative positions (the open positions of the contacts 26) and said certain other positions of the upper pendulum end and the zero position reference (the closed positions of the contacts 26).

The preferred inventive embodiment 10 under discussion is a motion and orientation responsive alarm device including an alarm circuit 28 for signalling, that is generating an alarm signal in response to, departure of the upper pendulum end 18 and the zero position reference 24 from their normal relative positions. The alarm circuit includes an electrical alarm 30 and the electrical contacts 26 which close to energize and thereby activate the alarm in response to relative movement of the upper pendulum end 18 and the zero position reference 24 from their normal relative positions to their other relative positions of contact with one another.

Referring now in more detail to the illustrated motion and orientation responsive alarm device 10, the pendulum 12 is uniquely constructed in accordance with the invention and comprises a long, slender, resiliently flexible, wire-like shaft 32. This pendulum shaft preferably comprises a steel wire. Fixed on the lower end of the shaft 32 is a weight 34. The resulting center 20 of mass of the pendulum is almost coincident with the center of mass of the weight 34.

The pendulum support 14 includes a hollow circular base 36 having an interior cavity 38 which opens thru the bottom of the base. Rising perpendicularly from the top wall 40 of the base 36 are a pair of posts 42, 44. These posts have reduced lower ends 46 which extend thru holes 48 in the top base wall 40 and are threaded to receive nuts 50 for rigidly securing the posts to the base 36. Spaced along and spanning the posts are lower and upper bridge plates 52, 54. These plates have openings 56, 58 receiving the posts 42, 44, respectively, and are rigidly fixed to the posts in a manner to be explained presently. Suffice it to say here that the lower bridge plate 52 is located some distance above the base top wall 40. The upper bridge plate 54 is situated at the upper ends of the posts.

The bridge plates 52, 54 contain holes 60, 62, respectively, coaxially aligned on a common axis about midway between the posts 42, 44 and substantially normal to the bottom surface 63 of the base 36. The pendulum 12 is disposed with its shaft 32 extending thru the plate holes 60, 62 and its weight 34 located between the top wall 40 of the base 36 and the lower pendulum support bridge plate 52. The pivot means 16 pivotally supports the pendulum 12 on the lower bridge plate 52 for rotation or swinging of the pendulum in any direction throughout a full 360 degrees about the pivot point 22.

Pivot means 16 comprises a lower pivot collar 64 and an upper pivot collar 66. The lower pivot collar 64 is fixed within the hole 60 in the lower bridge plate 52 and contains a coaxial, downwardly expanding conical opening 68 thru which extends the pendulum shaft 32. The upper, small diameter end of the opening 68 is just very slightly larger than the pendulum shaft, such that the pendulum 12 can pivot or rotate in the manner described herein. The lower collar has an upper, conically tapered end 70 which projects slightly above the bridge plate 40 and terminates at its upper end in a relatively small diameter circular edge surrounding the upper small diameter end of the tapered collar opening 68. The upper pivot collar 66 is coaxially fixed on the pendulum shaft 32 above the lower collar 64 and has a spherically rounded lower end surface 72 which rests on the upper small diameter edge of the lower collar to pivotally support the pendulum 12 for rotation or swinging in any direction about the pivot point 22.

The upper end 18 of the pendulum 12 extends thru the hole 62 in the upper bridge plate 54. In the present embodiment, the hole 62 is substantially larger in diameter than the pendulum shaft 32, and the upper pendulum end 18, which is the upper end of the shaft, is substantially centered in the hole when this pendulum end and the zero position reference 24 occupy their normal relative positions.

In the preferred inventive embodiment illustrated in FIGS. 1-6, the zero position reference 24 comprises a free floating reference member in the form of a light weight disc which is slidably supported on the upper bridge plate 54. This zero position reference disc has a central hole 78 and three uniformly circumferentially spaced edge portions bent downwardly to form three support legs 80. Legs 80 rest slidably on the upper bridge plate 54. The upper pendulum end 18 extends thru the hole 78 in the zero position reference disc 24. This hole is slightly larger in diameter than the pendulum shaft 32, such that the shaft may occupy a generally centered position in the hole without touching the edge of the hole.

Figure 3:
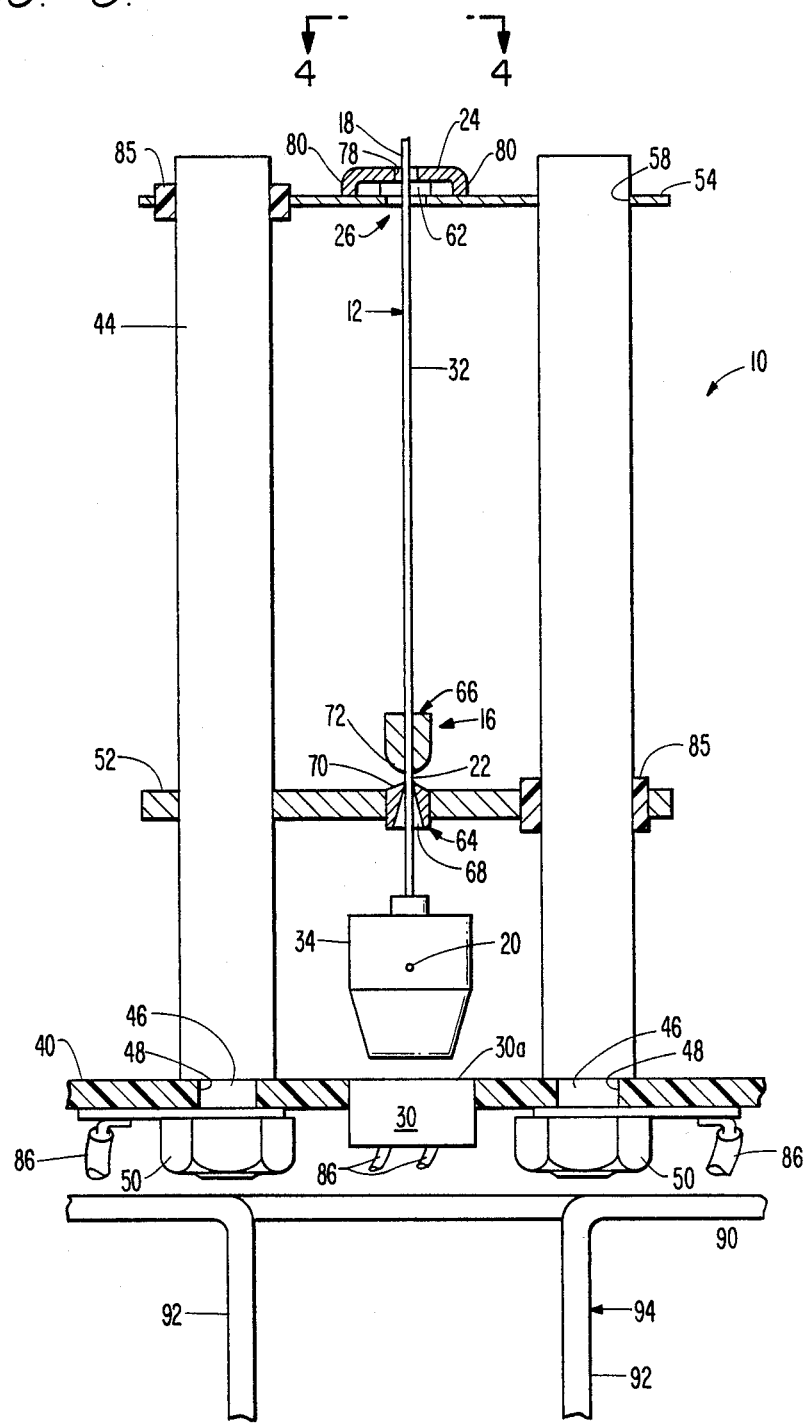
FIG. 3 is an enlarged section taken on line 3—3 in FIG. 2.
Figure 4:
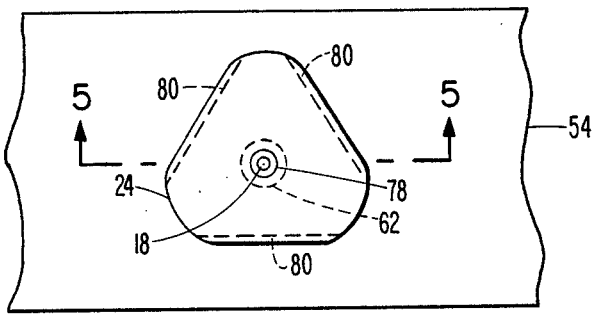
FIG. 4 is an enlarged view looking in the direction of the arrows on line 4—4 in FIG. 3.
Figure 5:
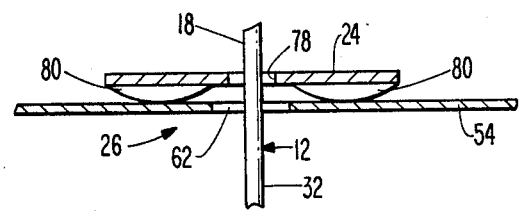
FIG. 5 is an enlarged section taken on line 5—5 in FIG. 4.

As mentioned earlier, the device 10 under discussion is a motion and orientation alarm device having an electrical alarm circuit 28 including the electrical contacts 26 and alarm 30. The preferred alarm 30 is a relatively small high intensity buzzer with a top diaphragm 30a and is mounted within the base 36 directly below the pendulum 12. As shown in FIG. 3, the upper diaphragm end of the buzzer fits within a hole in the top wall 40 of the base so that its diaphragm 30a is exposed and faces upwardly toward the upper pendulum support bridge plate.

The alarm circuit 28 also includes an off-on switch 82 mounted on the base top wall 40 at one side of the pendulum support posts 42, 44, a battery 84 mounted within the base 36, and electrical conductors connecting the electrical contacts 26, alarm 30, off-on switch 82, and battery 84 in electrical series. When the off-on switch 82 is closed, the alarm 30 is energized in response to closure of the contacts 26. As described earlier, the contacts 26 are closed by contact of the upper pendulum end 18 with the edge of the hole 78 in the zero position reference disc 24. In the preferred inventive embodiment illustrated in FIGS. 1-6, the pendulum shaft 32, pendulum pivot collars 64, 66, pendulum support posts 42, 44, bridge plates 52, 54, and zero position reference disc 24 are fabricated from suitable metals and provide, along with wires 86 which connect the alarm 30, switch 82, and battery 84 to one another and to the support posts, the electrical conductors of the alarm circuit 28.

As mentioned earlier, the supporting posts 42, 44 are rigidly fixed to the top wall 40 of the base 36. This base preferably comprises a plastic material which electrically insulates the posts from one another. If the base is metallic, the posts will be insulated from the base. The lower bridge plate 52 electrically contacts the post 44 and is insulated from the post 42 by an insulating sleeve 85. The upper bridge plate 54 electrically contacts the post 42 and is insulated from the post 44 by an insulating sleeve 85. Fixed on the lower ends of the supporting posts 42, 44 are terminals 88 to which are electrically connected certain of the alarm circuit wires 86.

Figure 6:
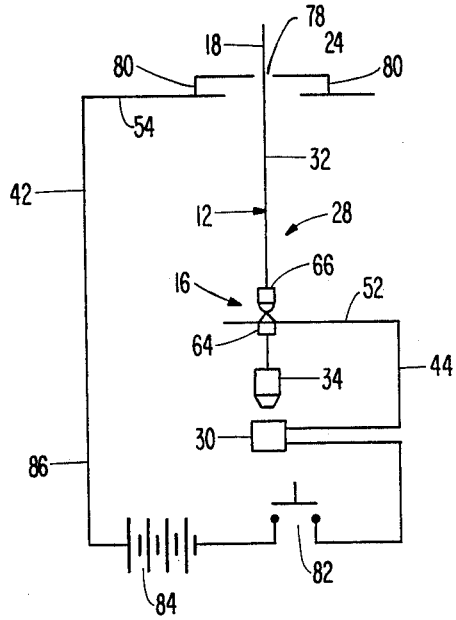
FIG. 6 is an electrical diagram of the device in FIGS. 1-5.

Referring particularly to FIG. 6, it will be seen that an electrical series circuit path may be traced from the upper pendulum end 18, thru the pendulum shaft 32, pendulum pivot collars 66, 64, lower bridge plate 52, supporting post 44, on-off switch 82, battery 84, alarm 30, supporting post 42, and upper bridge plate 54 to the zero position reference disc 24 thru its support legs 80 which are in slidable electrical contact with the latter bridge plate 54. Accordingly, mutual contact of the upper pendulum end 18 and the surrounding edge of the reference disc hole 78, which together constitute the contacts 26, effectively closes these contacts to complete an electrical energizing circuit thru the alarm 30 to activate the alarm.

Fixed within the base 36 is a plate 90 from which are bent depending flanges 92. These flanges form a battery holder 94 and are spaced to firmly but releasibly grip therebetween the battery 84. The battery is removable from and replaceable in the battery holder 94 thru the open bottom of the base 36.

The illustrated alarm device 10 has a removable dome-shaped cover 96 which seats on the base 36 to shield the parts of the device above the base against dust, drafts, and other environmental elements which would adversely affect the operation of the device. This cover is preferably transparent to enhance the appearance of the device and to permit its interior to be observed. The cover may have openings 98 to render more audible the sound of the alarm 30.

As mentioned earlier and as will now be evident, the motion and orientation responsive device of the invention has many useful applications. The particular device 10 illustrated in FIGS. 1-6 is designed primarily for use as a seismic or earthquake alarm. In this use, the base 36 of the device is placed on a table, shelf or other substantially horizontal surface. This locates the pendulum support 14 in its normal orientation relative to the gravitational field. The pendulum 12 then assumes its normal vertical position wherein an axis passing thru the pivot center 22 and center of mass 20 of the pendulum is substantially vertical. In the illustrated embodiment, the pendulum shaft 32 substantially coincides with this axis and is thus also substantially vertical in the normal vertical pendulum position. The zero position reference disc 24 is positioned edgewise on the upper bridge plate 54 by the upper pendulum end 18. Assuming that the upper pendulum end 18 is then generally centered within the hole 78 in the zero position reference disc 24, so that there is no contact between the pendulum end and the disc, the alarm device 10 will be in its normal quiescent state with the alarm 30 inactivated. These latter, generally centered relative positions of the upper pendulum end 18 and the zero position reference 24 are their normal relative positions.

Assume now that the alarm device 10 is actuated by a seismic disturbance in any one of the modes mentioned earlier, namely mode (a) involving generally horizontal motion of the pendulum support 14 causing rotation or oscillation of the pendulum 12 about its pivot 22 relative to both the pendulum support and the gravitational field while the support remains substantially in its normal orientation relative to the gravitational field, or mode (b) involving angular motion of the pendulum support 14 about the pendulum pivot 22 relative to both the pendulum 12 and the gravitational field while the pendulum remains in substantially its normal vertical position, or mode (c) involving simultaneous horizontal and angular motion of the pendulum support 14 causing both rotation or oscillation of the pendulum and angular movement of the support about the pendulum pivot 22 relative to one another and to the gravitational field.

When the seismic alarm device 10 is thus actuated, the upper pendulum end 18 and the zero position reference 24 i.e. reference disc 24, undergo relative movement with respect to one another from their normal relative positions to other relative positions in which the pendulum end and reference disc contact one another. This contact constitutes closure of the contacts 26 which energizes the alarm 30 to signal the occurrence of the seismic disturbance.

It will be understood that this operation of the alarm device 10 presents two requirements, namely (1) rapid normalization, and preferably rapid automatic normalization, of the device (i.e. return of the device to its normal quiescent state) by opening of the contacts 26 to inactivate the alarm 30 following a seismic or other disturbance of the device, and (2) sufficient sensitivity of the device to respond to, that is to activate the alarm 30 in response to, seismic disturbances of the desired minimum threshold magnitude. A highly unique and beneficial feature of the invention resides in an automatic normalizing action involving automatic or self-realignment of the upper pendulum end 18 and zero position reference 24 in their normal relative positions which occurs in the device to restore it to its normal quiescent state when it becomes stationary in its normal orientation following a seismic disturbance. This automatic normalizing action occurs throughout a limited range of deviations from the horizontal of the surface which supports the alarm device and thus permits initial set up of the device for operation without precise positioning or adjustment of the device to compensate or correct for manufacturing tolerances or supporting surfaces which are not truly horizontal.

In this regard, it is evident that the orientation of the supporting surface to the horizontal determines the orientation of the pendulum support 14 to the gravitational field. Thus, as noted earlier, the common axis of the holes 60 and 62 in the lower and upper bridge plates 52, 54 is aligned substantially normal to the bottom surface of the base 36. Accordingly, a precisely horizontal supporting surface will orient the pendulum support 14 with this common axis substantially vertical. Similarly, any deviation of the supporting surface from the horizontal will result in the same deviation of the common axis from the vertical. The automatic normalizing action of the device 10 occurs throughout and thereby accommodates a limited range of deviations of the pendulum support 14, or more specifically the common axis of the bridge plate holes 60, 62, from the vertical. In the context of this invention, the normal orientation, referred to earlier, of the pendulum support 14 relative to the gravitational field is any orientation within this latter limited range of deviations from the vertical. As described below, the automatic normalizing action of the device 10 will occur and will operate to rapidly and automatically reopen the contacts 26 and thereby inactivate the alarm 30 of the device in response to restoration of the device to a stationary state with the pendulum support 14 in this normal orientation relative to the gravitational field, i.e. with the pendulum support orientation within the permissible limited range of deviation from the vertical.

In this regard, it is significant to note that the upper pendulum end 18 will be substantially centered in the hole 62 in the upper bridge plate 54 when the pendulum support 14 is vertical. If the support is angularly displaced from the vertical, the upper pendulum end will be off center in the hole. Hole 54 is made sufficiently large in diameter that the upper pendulum end will not contact the edge of the hole as long as the orientation of the pendulum support remains within the permissible range of deviations from the vertical, i.e. as long as the support occupies its normal orientation.

The automatic normalizing action of the device 10 occurs in the following manner. In the quiescent state of the device with the latter in its normal orientation relative to the gravitational field, the pendulum 12 will assume its normal vertical position, and its upper end 18 will locate the zero position reference disc 24 edgewise on the upper bridge plate 54 in accordance with the deviation, if any, of the pendulum support 14 from the true vertical (within the permissible maximum deviation range). Assume, for the moment, that the upper pendulum end 18 and the zero reference position disc 24 occupy their normal relative positions wherein the pendulum end is generally centered within the disc hole 62 and hence does not contact the disc. Under these conditions, the alarm 30 is silent, and the device is in its normal quiescent state. If a seismic disturbance occurs, it will cause one of the three earlier mentioned modes of relative movement of the pendulum 12 and its support 14 and resultant relative displacement of the upper pendulum end 18 and the zero reference position disc 24 from their normal relative positions. Assuming that the magnitude of the seismic disturbance equals or exceeds the threshold disturbance level of the device required to cause sufficient relative displacement of the upper pendulum end and the zero position reference disc to bring the edge of the disc hole 78 and the pendulum into contact, such contact, which constitutes closure of the contacts 26, energizes the alarm 30 to signal occurrence of the seismic disturbance.

Assume now that the disturbance ceases with the device 10 still in its normal orientation relative to the gravitational field. One of two conditions will then exist. Either the upper pendulum end 18 and the zero position reference disc 24 will occupy their normal relative positions, wherein they are spaced from one another so that the contacts 26 are open, or the upper pendulum end will contact the edge of the disc hole 62 so that the contacts 26 are closed. If the former condition exists, i.e. the contacts 26 are open, the alarm 30 will be deenergized, and the device will be in its quiescent state and remain in that state until the next seismic or other disturbance. If the latter condition exists, i.e. the contacts 26 are closed, the alarm 30 will be energized, and the acoustic waves generated by the alarm vibrate the reference or contact disc 24, and the upper bridge plate 54. This vibration of the disc and upper bridge plate will almost instantaneously separate the contacts 26, that is separate the upper pendulum end 18 from the edge of the disc hole 62, thereby deenergizing the alarm 30 and restoring the device to its normal quiescent state, assuming that the pendulum support 14 still occupies its normal orientation, defined earlier.

According to a preferred feature of the invention, the position reference disc or contact 24 and the upper bridge plate 54 are relatively thin and lightweight, such that the acoustic waves generated by the alarm 30 will excite sympathetic or resonant vibrations in the disc and bridge plate. It has been found that such sympathetic or resonant vibration of the disc and plate accelerates the normalizing action of the device and rapidly restores the device to its normal quiescent state.

From this description, it will be understood that the alarm device 10 possesses an automatic normalizing action which is operative, following a seismic or other disturbance that activates the alarm 30, to rapidly restore the device to its quiescent state in which the upper pendulum end 18 and zero position reference 24 occupy their normal relative positions.

As mentioned earlier and is now evident, the seismic alarm device of the invention should have a relatively high level of sensitivity to seismic disturbances, that is the device should possess a very low seismic disturbance threshold response level, such that the device will sound an alarm in response to a very low level seismic disturbance. According to another highly unique and beneficial feature of the invention, the sensitivity of the present seismic alarm device is enhanced to such a low threshold level by locating the pivot point 22 of the pendulum 12 between the longitudinal center and the center of mass 20 of the pendulum and preferably close to the pendulum weight 34, as shown in FIG. 3, in order to amplify the lateral movement or displacement of the upper pendulum end 18 resulting from given angular movement or displacement of the pendulum. As a consequence of this amplification, a relatively small lateral displacement of the lower center of mass of the pendulum in response to a low level seismic disturbance will cause a substantially greater lateral displacement of the upper pendulum end 18, thereby establishing a relatively low threshold seismic disturbance level required to activate the alarm 30.

As described earlier, the preferred pendulum shaft 32 for the illustrated seismic alarm device 10 is a resiliently flexible steel wire. It is believed that during disturbance-induced oscillation of the pendulum 12, such a wire pendulum shaft undergoes a whip-like motion which enhances both the automatic normalizing action and sensitivity of the device. The location of the alarm 30 directly below the upper bridge plate 54 is also believed to aid the normalizing action by directing acoustic waves upwardly toward the plate and contact disc 24 thereon to vibrate them, as described. As mentioned earlier, a relatively thin lightweight contact disc 24 and upper bridge plate 52 also aid the normalizing action by enabling the acoustic alarm signal to excite sympathetic or resonant vibrations in the plate and disc.

A highly effective operating alarm device like that illustrated in FIGS. 1-6 has been constructed. The cover 96 of this alarm device was a transparent dome which exposed the pendulum 12 and pendulum support 14 in a manner which provided the device with a very pleasing appearance. The alarm device was very sensitive to applied disturbances and rapidly returned to its quiescent state following cessation of the disturbance. The device was constructed with the following approximate dimensions:

Pendulum steel wire shaft
shaft dia: 0.020 in.
lower weight: ½ oz.
pivot to—
mass center: ½ in.
upper end: 2 in.

Zero reference/contact disc brass
diameter: ½ in.
thickness: 0.010 in.
hole dia: 0.040 in.

Upper bridge plate brass
thickness: 0.010 in.

Figure 7:
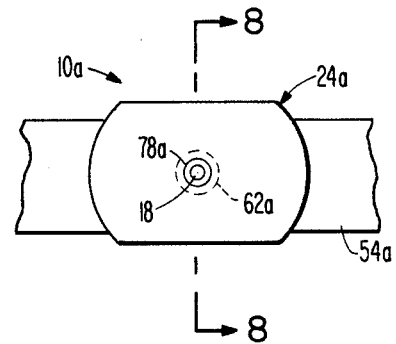
FIG. 7 illustrates a modification of the device in FIGS. 1-6.
Figure 8:
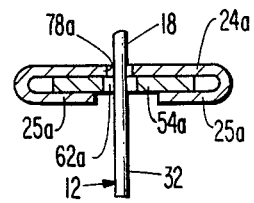
FIG. 8 is a section taken on line 8—8 in FIG. 7.

FIGS. 7 and 8 illustrate the zero position reference disc 24a and upper bridge plate 54a of a modified motion and orientation alarm device 10a according to the invention which is otherwise identical to that of FIGS. 1-6. Bridge plate 54a may be somewhat thicker than plate 52, if desired. Zero position reference disc 24a has a diameter greater than the width of the bridge plate 54a and has diametrically opposite portions 25a bent around the longitudinal edges and against the underside of the bridge plate 54a to frictionally grip the plate. The disc is thereby secured to the bridge plate for edgewise adjustment relative to the plate. Bridge plate 54a has a hole 62a of the same diameter as the upper bridge plate hole 62 in FIGS. 1-6 and coaxially aligned with the lower bridge plate hole 60 (not shown in FIGS. 7 and 8). Disc has a central hole 78a of the same diameter as the hole in disc 24 of FIGS. 1-6.

When initially setting up the modified device 10a for operation, its zero position reference disc 24a is manually adjusted edgewise to center the upper pendulum end in the disc hole 78a and thereby compensate or correct for manufacturing tolerances and the orientation relative to the horizontal of the surface on which the device is mounted. During a seismic disturbance, the device operates in much the same way as device 10 to activate the alarm 30 (not shown in FIGS. 7 and 8). Upon cessation of the disturbance, the pendulum 12a of the modified device returns to its initial adjusted position to inactivate the alarm.

Figure 10:
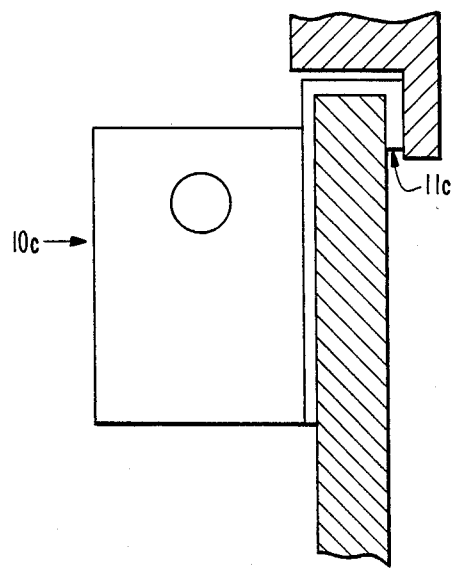
FIG. 10 illustrates an intrusion alarm according to the invention.
Figure 9:
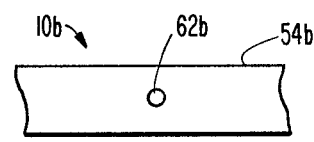
FIG. 9 illustrates another modification of the device in FIGS. 1-6.

The modified motion and orientation responsive alarm device 10b of FIGS. 9 and 10 is like the device 10a of FIGS. 7 and 8 except that the zero reference position disc 24a is eliminated and the hole 62b in the upper bridge plate 54b has the same diameter as the holes 78 and 78a in the zero reference position discs of FIGS. 1-8. In the modified device 10b, the bridge plate 54b and its hole 62b function as the zero position reference.

The modified device 10b operates in the same way as the device 10a except that initial adjustment of the device to center the upper pendulum end in the zero position reference hole 62b is accomplished by proper positioning of the device.

It will be immediately evident at this point that while the invention has been described primarily in the context of earthquake detection, an alarm device according to the invention can be used for many other purposes.

Figure 11:
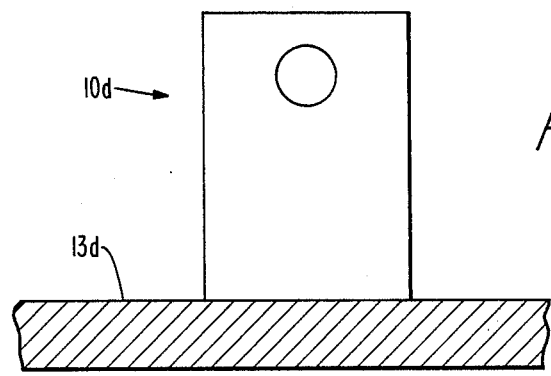
FIG. 11 illustrates a tilt alarm according to the invention.

Two of these other purposes are illustrated in FIGS. 10 and 11. The alarm devices in these latter figures can be considered to be identical to any one of those described earlier except for their outer housings which, in FIGS. 10 and 11 are shown to be simple rectangular housings containing openings to render the alarm signal more audible. The interior structure of the modified alarm devices is identical to any of those described earlier, although the preferred alarm structure is that of FIGS. 1-6.

The alarm device 10c of FIG. 10 is an intrusion alarm having a bracket 11c to be hooked over the top edge of a door 13c, as shown, for actuation of the alarm in response to horizontal motion of the device upon opening of the door by an intruder. The alarm device 10d of FIG. 11 is a tilt alarm to be placed on a supporting surface 13d which is subject to tilting. In this case, the alarm is actuated by the tilting motion of the device in response to tilting of the surface.

It will also be evident at this point that the automatic normalizing circuit of the invention provides, on the one hand, a novel electrical system for automatically aligning a movable electrical contact (pendulum) and a floating electrical contact (contact disc) which are coupled for limited relative movement between normal aligned relative positions wherein the contacts are relatively centered with respect to and spaced from one another and non-aligned relative positions wherein the contacts engage one another, and on the other hand a novel vibrationally or acoustically actuated electrical control circuit in which a vibratory contact is vibrationally driven into and from engagement with another contact to close and open the contacts and thereby control an electrical appliance (buzzer). This feature of the invention can conceivably be used for a variety of purposes other than that disclosed herein.

I claim:

1. A motion and orientation responsive device comprising:
   a pendulum having normally upper and lower ends, and a center of mass at said lower end,
   a pendulum support,
   pivot means pivotally mounting said pendulum between its ends on said support for swinging of the pendulum about a pivot point located close to said mass center such that the pendulum length between said pivot point and said upper pendulum end is several times the pendulum length between said pivot point and said mass center, whereby the pendulum has a normal generally vertical position relative to the gravitational field wherein said center of mass is situated below said pivot means, and
   a zero position reference member mounted on said support at said upper pendulum end for cooperation with said upper pendulum end to indicate movement of said pendulum from said normal position thereof.

2. A motion and orientation responsive device according to claim 1 wherein:
   said reference member is movable laterally of said upper pendulum end.

3. A motion and orientation responsive device according to claim 1 wherein:
   said pendulum comprises a relatively stiff but resiliently flexible shaft and a weight on the lower end of the shaft.

4. A motion and orientation responsive device according to claim 3 wherein:
   said pendulum shaft comprises a spring wire.

5. A motion and orientation responsive device according to claim 4 wherein:
   said pendulum has a longitudinal center and said pivot means is situated between the longitudinal center and said center of mass of the pendulum.

6. A motion and orientation responsive device comprising:
   a pendulum including a shaft having normally upper and lower ends, and a weight at said lower shaft end, and said pendulum having a center of mass at said lower shaft end,
   a pendulum support,
   a pivot means pivotally mounting said pendulum shaft between its ends on said support, whereby the pendulum has a normal position relative to the gravitational field wherein said center of mass is situated below said pivot means, and the pendulum has a normally upper end portion of substantial length between said pivot means and said upper shaft end, and
   a zero position reference member associated with the upper end of said pendulum shaft and mounted on said support for adjustment laterally of said upper shaft end to locate said upper shaft end and said position reference member in certain normal relative positions with respect to one another when said device is stationary with said support disposed in a certain normal orientation and said pendulum disposed in its normal vertical position both relative to the gravitational field, whereby said upper shaft end and said position reference member undergo relative movement from said normal relative positions thereof to other relative positions in response to translational and/or rotational displacement of the device.

7. A motion and orientation responsive device according to claim 6 wherein:
   said pivot means supports said pendulum for pivotal movement in any direction about a pivot point along said pendulum shaft,
   said position reference member contains a hole receiving and larger in diameter than said upper shaft end,
   said upper shaft end is generally centered within and spaced from the edge of said hole in said normal relative positions of said upper shaft end and said position reference member, and said upper shaft end enters into contact with the hole edge upon relative movement of said upper shaft end and said position reference member from said normal relative positions to said other relative positions thereof in response to translational and/or rotational displacement of the device, said position reference member is adjustable in any lateral direction of said upper end of said pendulum shaft to locate said upper shaft end and said position reference member in said normal relative positions thereof.

8. A motion and orientation responsive device comprising:
   a pendulum including a resiliently flexible wire shaft having normally upper and lower ends, and a weight at said lower shaft end, and said pendulum having a center of mass at said lower shaft end,
   a pendulum support,
   pivot means pivotally mounting said pendulum shaft between its ends on said support, whereby the pendulum has a normal generally vertical position relative to the gravitational field wherein said center of mass is situated below said pivot means, and the pendulum has a normally upper end portion of substantial length between said pivot means and a zero position reference member containing a hole receiving and larger in diameter than the upper end of said pendulum shaft, means mounting said position reference member on said support for adjustment laterally of said upper shaft end, and wherein said pivot means supports said pendulum for pivotal movement in any direction about a pivot point located along said pendulum shaft, said position reference member is adjustable in any lateral direction of said upper shaft end to locate said upper shaft end and said position reference member in certain normal relative positions thereof wherein said upper shaft end is generally centered within and spaced from the edge of said hole when said device is stationary with said support disposed in a certain normal orientation and said pendulum disposed in its normal vertical position both relative to the gravitational field, and said upper shaft end enters into contact with the hole edge upon relative movement of said upper shaft end and said position reference member from said normal relative positions to certain other relative positions thereof in response to translational and/or rotational displacement of the device.

9. A motion and orientation responsive device comprising:
a pendulum having normally upper and lower ends, and a center of mass at said lower end,
a pendulum support,
pivot means mounting said pendulum on said support, whereby said pendulum has a normally generally vertical position relative to the gravitational field wherein said center of mass of the pendulum is situated under said pivot means,
a zero position reference member associated with said pendulum, means on said pendulum support supporting said position reference member for movement laterally of said pendulum,
means coupling said pendulum and said position reference member for limited relative movement thereof laterally of the pendulum between certain normal relative positions and other relative positions of the pendulum and the member with respect to one another,
means for effecting automatic alignment of said pendulum and said position reference member in said normal relative positions thereof when said device is stationary with said pendulum in its normal vertical position and said support disposed in a certain normal orientation relative to the gravitational field, and wherein
said pendulum and said position reference member undergo relative displacement from said normal relative positions to said other relative positions thereof in response to translational and/or rotational displacement of the device.

10. A motion and orientation responsive device according to claim 9 wherein:
said automatic alignment means comprises an electrical circuit responsive to the relative positions of said pendulum and said position reference member for vibrating said position reference member when said pendulum and said position reference member occupy said other relative positions thereof in such manner as to effect relative vibrational movement of said pendulum and said position reference member from said other relative positions thereof and thereby termination of the vibrations.

11. A motion and orientation responsive device according to claim 10 wherein:
said pendulum and said position reference member are electrically conductive and contact one another in said other relative positions thereof and are spaced from one another in said normal relative positions thereof,
said electrical circuit includes an electrical vibration source, and means for energizing said source thru said pendulum and said position reference member when they contact one another in said other relative positions thereof, and said vibration source is deenergized to cease vibrating the member and its supporting means when the pendulum and the position reference member are separated in their normal relative positions.

12. A motion and orientation responsive device according to claim 11 wherein:
said supporting means for said position reference member is electrically conductive,
said position reference member is disposed in sliding electrical contact with said supporting means, and
said energizing means comprises means for energizing said vibration source thru said supporting means, said position reference member, and said pendulum in electrical series when said pendulum and said position reference member contact one another in said other relative positions thereof.

13. A motion and orientation responsive device according to claim 12 wherein:
said pendulum comprises a weight at said lower pendulum end and an electrically conductive shaft extending from said weight to said upper pendulum end,
said pivot means supports said pendulum for pivotal movement in any direction about a pivot point along said shaft,
said means coupling said pendulum and said position reference member for limited relative movement laterally of the pendulum comprises a hole in said member receiving and larger in diameter than said pendulum shaft, and
said pendulum shaft is spaced from the edge of the hole when said pendulum and said position reference member occupy said normal relative positions thereof, and said pendulum shaft contacts the hole edge in said other relative positions of the pendulum end and position reference member.

14. A motion and orientation responsive device according to claim 13 wherein: said vibration source is an alarm buzzer for signalling translational and rotational displacement of said device.

15. A motion and orientation responsive device according to claim 13 wherein:
said pivot point is situated between the ends of said pendulum shaft, whereby said shaft has a normally upper end portion of substantial length between said pivot point and said upper shaft end, and
said upper shaft end is disposed within said hole in said position reference member for relative movement into and from contact with the hole edge upon relative movement of the pendulum and the position reference member between said normal and said other relative positions thereof.

16. A motion and orientation responsive device according to claim 15 wherein:
said pendulum has a longitudinal center, and said pivot means is situated between the longitudinal center and said center of mass of the pendulum, and
said pendulum shaft is resiliently flexible.

17. A motion and orientation responsive device according to claim 16 wherein:
said pendulum shaft comprises a wire.

18. A motion and orientation responsive device according to claim 9 wherein:
said pendulum comprises a shaft having a normally upper end which constitutes said upper pendulum end and a normally lower end and a weight at said lower shaft end,
said pivot means is situated between said shaft ends, whereby said shaft has a normally upper end portion of substantial length extending from said pivot means to said upper shaft end, and
said upper shaft end and said position reference member are coupled for said limited relative movement between said normal and said other relative positions of said pendulum and position reference member.

19. A motion and orientation responsive device comprising:
a pendulum having normally upper and lower ends and a weight at said lower end, and said pendulum having a center of mass at said lower end,
a pendulum support,
pivot means pivotally mounting said pendulum between its ends on said support, whereby the pendulum has a normal generally vertical position relative to the gravitational field wherein said center of mass is situated below said pivot means, and the pendulum has a normally upper end portion of substantial length between said pivot means and said upper pendulum end,
a zero position reference member mounted on said support and associated with said upper pendulum end, whereby said upper pendulum end and said position reference member occupy certain normal relative positions when said device is stationary with said support disposed in a certain normal orientation and said pendulum disposed in its normal vertical position both relative to the gravitational field, and said upper pendulum end and said position reference member undergo relative movement from said normal relative positions thereof to other relative positions in response to translational and/or rotational displacement of the device, and
an electrical alarm circuit responsive to the relative positions of said upper pendulum end and said position reference member in such manner that said circuit has one state when said upper pendulum end and said position reference member occupy said normal relative positions thereof and another state when said upper pendulum end and said position reference member occupy said other relative positions thereof.

20. A motion and orientation responsive device according to claim 19 wherein:
said upper pendulum end and said position reference member are electrically conductive and spaced from one another in said normal relative positions thereof, and said upper pendulum end and said position reference member contact one another in said other relative positions thereof, and
said alarm circuit is energized thru said upper pendulum end and said position reference member when said upper pendulum end and said position reference member contact one another in said other relative positions thereof, and said alarm circuit is deenergized when the pendulum and position reference member are separated in their normal relative positions.

21. A motion and orientation responsive device according to claim 20 wherein:
said pivot means supports said pendulum for pivotal movement in any direction about a pivot point,
said position reference member contains a hole receiving and larger in diameter than said upper pendulum end, and
said upper pendulum end is generally centered within and spaced from the edge of said hole to deenergize said alarm circuit in said normal relative positions of said upper pendulum end and said position reference member, and said upper pendulum end enters into contact with the hole edge to energize said alarm circuit upon relative movement of said upper end and said position reference member from said normal relative positions to said other relative positions thereof in response to translational and/or rotational displacement of the device.

22. A motion and orientation responsive device according to claim 21 wherein:
said position reference member is adjustable in any lateral direction of said upper pendulum end to locate said upper pendulum end and said position reference member in said normal relative positions thereof.

23. A motion and orientation responsive device according to claim 21 wherein:
said pendulum support comprises means supporting said position reference member for movement in any lateral direction of said upper pendulum end,
engagement of said upper pendulum end in said hole in said position reference member couples said upper end and said member for limited relative movement laterally of said upper pendulum end between said normal relative positions and said other relative positions thereof, and
said alarm circuit includes means activated by energizing of the circuit for effecting automatic alignment of said upper pendulum end and said position reference member in said normal relative positions thereof when said device is stationary with said support disposed in its normal orientation and said pendulum disposed in its normal vertical position both relative to the gravitational field.

24. A motion and orientation responsive device according to claim 23 wherein:
said means for effecting automatic alignment of said upper pendulum end and said position reference member comprises an electrical vibration source in said alarm circuit which is energized by contact of said upper pendulum end with the edge of the hole in said position reference member and vibrates the member out of contact with the upper pendulum end.

25. A motion and orientation responsive device according to claim 24 wherein:
said supporting means for said position reference member is electrically conductive, said position reference member is disposed in sliding electrical contact with said supporting means, and said alarm circuit comprises means for energizing said vibration source thru said supporting means, said position reference member, and said pendulum in electrical series when said pendulum and said position reference member contact one another in said other relative positions thereof.

26. A motion and orientation responsive device according to claim 25 wherein:

said vibration source is an alarm buzzer for signalling translational and/or rotational displacement of said device.

27. A device according to claim 26 wherein:

said pendulum comprises a resiliently flexible shaft having a normally upper end constituting said upper pendulum end engagable with said position reference member, and said pivot means is situated between the longitudinal center and said center of mass of said pendulum.

28. A motion and orientation responsive device according to claim 27 wherein:

said pendulum shaft comprises a wire.

29. A motion and orientation responsive alarm device for use as an earthquake alarm, intrusion alarm, tilt alarm or the like comprising:

a pendulum having a longitudinal center and including a slender electrically conductive shaft in the form of a spring wire having normally upper and lower ends, and a weight on said lower end providing said pendulum with a normally lower center of mass situated close to the center of mass of said weight and substantially on the longitudinal axis of said shaft, a pendulum support including means for mounting said alarm device on a supporting structure with said pendulum support disposed in a certain normal orientation relative to the gravitational field, pivot means mounting said pendulum on said pendulum support for swinging of the pendulum about a pivot point located between the longitudinal center and said center of mass of the pendulum, said pendulum having a normal generally vertical position wherein said pendulum axis is substantially vertical, an electrical contact member having a hole larger than the upper end of said pendulum shaft, means supporting said contact member over said pendulum with the upper end of the pendulum shaft extending thru said hole in the member, and an electrical alarm circuit including an alarm, and means for energizing said alarm thru the upper end of said pendulum shaft and said contact member in electrical series in response to contact of said upper shaft end with the edge of said hole in said contact member.

30. An alarm device according to claim 29 including:

means for adjusting said contact member laterally of the upper end of said pendulum shaft.

31. An alarm device according to claim 29 wherein:

said supporting means for said contact member is electrically conductive and slidably supports said member for movement laterally of the upper end of said pendulum shaft, said pendulum support is electrically conductive, said alarm is a buzzer, said alarm circuit includes means for energizing said buzzer thru said pendulum support, said contact member supporting means, said contact member, and said pendulum shaft in electrical series when said upper shaft end contacts the edge of said hole in the member, and said buzzer when energized by contact of said upper pendulum shaft end with said contact member vibrates the contact member out of contact with the upper shaft end to deenergize the buzzer.

32. An alarm device according to claim 29 wherein:

said means for mounting said alarm device on a supporting structure comprises a base for placement on a generally horizontal surface, and said pendulum support extends upwardly from said base.

33. An alarm device according to claim 29 wherein:

said means for mounting said alarm device on a supporting structure comprises a bracket for mounting the device on a closure such as a door.

34. A vibration-actuated electrical circuit comprising:

a support, a first movable electrical contact mounted on said support for movement relative to the support, a second vibratory electrical contact mounted on said support for movement relative to the support, means connecting said contacts for movement of said vibratory contact with said first contact to different positions relative to said support and for relative vibratory movement of said vibratory contact into and from engagement with said first contact in any given position of the first contact relative to the support, an electrical vibration source for generating vibrations for vibrating said vibratory contact into and from engagement with said first contact in any given position of the first contact relative to said support, and means including said contacts for energizing said vibration source through said contacts when the contacts are engaged.

35. A circuit according to claim 34 wherein: said vibration source is an acoustic buzzer.

36. A circuit according to claim 35 wherein:

said other contact is a pendulum.

37. A motion and orientation responsive device comprising:

a pendulum including a spring wire shaft having a lower end and an upper free end and a weight at said lower shaft end, a pendulum support, pivot means pivotally mounting said pendulum shaft between its ends on said support, and a zero position reference member on said support at the upper free end of said pendulum shaft for cooperation with said upper shaft end to indicate movement of said pendulum relative to said support.

38. A motion and orientation responsive device according to claim 37 wherein:

said zero position reference member is movable laterally of said upper pendulum shaft end, and said pendulum and said zero position reference member include means coupling said upper shaft end and said reference member for limited relative movement laterally of said upper shaft end.

39. A motion and orientation responsive device according to claim 37 wherein:

said zero position reference member is slidable on said support for relatively free sliding movement laterally of said upper pendulum shaft end, and said zero position reference member contains a hole receiving and slightly larger in diameter than said upper pendulum shaft end, whereby said upper shaft end and said reference member are coupled for limited relative movement laterally of said upper shaft end.

* * * * *